(12) United States Patent
Van Der Tempel

(10) Patent No.: US 11,761,162 B2
(45) Date of Patent: Sep. 19, 2023

(54) OFFSHORE STRUCTURE COMPRISING A COATED SLIP JOINT AND METHOD FOR FORMING THE SAME

(71) Applicant: DELFT OFFSHORE TURBINE B.V., Delft (NL)

(72) Inventor: Jan Van Der Tempel, Delft (NL)

(73) Assignee: DELFT OFFSHORE TURBINE B.V., Delft (NL)

( * ) Notice: Subject to any disclaimer, the term of this patent is extended or adjusted under 35 U.S.C. 154(b) by 139 days.

(21) Appl. No.: 16/340,298

(22) PCT Filed: Oct. 10, 2017

(86) PCT No.: PCT/NL2017/050665
§ 371 (c)(1),
(2) Date: Apr. 8, 2019

(87) PCT Pub. No.: WO2018/070868
PCT Pub. Date: Apr. 19, 2018

(65) Prior Publication Data
US 2020/0040541 A1 Feb. 6, 2020

(30) Foreign Application Priority Data

Oct. 10, 2016 (NL) .................................... 2017594

(51) Int. Cl.
*E02B 17/04* (2006.01)
*F03D 13/20* (2016.01)
(Continued)

(52) U.S. Cl.
CPC ............ *E02B 17/04* (2013.01); *E02D 27/425* (2013.01); *F03D 13/22* (2016.05); *F03D 13/25* (2016.05);
(Continued)

(58) Field of Classification Search
CPC ............ E02B 17/04; E02B 2017/0091; E02B 17/0004; E02B 17/027; F03D 13/22;
(Continued)

(56) References Cited

U.S. PATENT DOCUMENTS 2,036,771 A 4/1936 Pfistershammer
2,066,419 A * 1/1937 Pfistershammer ...... E04H 12/08
52/843
(Continued)

FOREIGN PATENT DOCUMENTS

EP 2910686 * 8/2015
EP 2910686 A2 8/2015
(Continued)

OTHER PUBLICATIONS

International Preliminary Report on Patentability and Written Opinion of the International Searching Authority dated Apr. 16, 2019 issued in corresponding International Application No. PCT/NL2017/050665.
(Continued)

*Primary Examiner* — Brian E Glessner
*Assistant Examiner* — Adam G Barlow
(74) *Attorney, Agent, or Firm* — Pillsbury Winthrop Shaw Pittman, LLP

(57) ABSTRACT

Offshore structure comprising a pile of a foundation and at least one offshore element, mounted on the pile, forming a slip joint, wherein between an inner surface of the offshore element and an outer surface of the pile: —a coating, especially an anti-fouling coating is provided, increasing friction between the said two surfaces and/or preventing corrosion of one or both of said surfaces and/or —at least two spaced apart areas are provided with a substance, forming a seal between the said outer surface and the said inner surface, near an upper end of the pile and the off shore
(Continued)

element and between a lower end of the off shore element and the pile.

16 Claims, 9 Drawing Sheets

(51) Int. Cl.
*F03D 13/25* (2016.01)
*E02D 27/42* (2006.01)
*E02B 17/00* (2006.01)

(52) U.S. Cl.
CPC ... *E02B 2017/0091* (2013.01); *F05B 2230/50* (2013.01); *F05B 2240/95* (2013.01)

(58) Field of Classification Search
CPC .... F03D 13/25; E02D 27/425; F05B 2230/50; F05B 2240/95; E04H 12/085; E04H 12/342
USPC .................................................. 52/40, 223.4
See application file for complete search history.

(56) References Cited

U.S. PATENT DOCUMENTS

| | | | | |
|---|---|---|---|---|
| 3,034,209 A * | 5/1962 | Bianca | ................. | E04H 12/08 29/521 |
| 6,191,355 B1 * | 2/2001 | Edelstein | ................. | E04H 12/08 174/45 R |
| 7,607,276 B2 * | 10/2009 | Gordin | ................. | E04H 12/2292 52/746.1 |
| 7,877,935 B2 * | 2/2011 | Ollgaard | ................. | E04H 12/34 52/153 |
| 8,082,719 B2 * | 12/2011 | Bagepalli | ................. | F03D 13/10 174/45 R |
| 8,251,004 B2 * | 8/2012 | Olsen | ................. | B63B 27/08 405/209 |
| 8,613,569 B2 * | 12/2013 | Belinsky | ................. | F03D 13/10 405/209 |
| 9,091,097 B2 * | 7/2015 | Holmes | ................. | E04H 12/342 |
| 9,416,555 B2 * | 8/2016 | De Abreu | ................. | E04H 12/20 |
| 9,518,564 B2 * | 12/2016 | Dagher | ................. | B63B 1/048 |
| 9,890,510 B2 * | 2/2018 | Fernandez Gomez | . | F03D 13/22 |
| 2001/0052700 A1 * | 12/2001 | Starita | ................. | F16L 21/03 285/330 |
| 2004/0094903 A1 * | 5/2004 | Sutherland | ............ | F16L 21/035 277/609 |
| 2007/0045968 A1 * | 3/2007 | Long | ................. | B29C 45/1459 277/608 |
| 2009/0169393 A1 * | 7/2009 | Bagepalli | ................. | E04H 12/08 52/309.1 |
| 2010/0059940 A1 * | 3/2010 | Monteil | ................. | F16L 21/03 277/627 |
| 2010/0101173 A1 * | 4/2010 | Bagepalli | ................. | E04H 12/085 52/651.01 |
| 2011/0006538 A1 * | 1/2011 | Fischer | ................. | F03D 13/25 52/745.18 |
| 2011/0061332 A1 * | 3/2011 | Hettick | ................. | B29C 66/723 52/651.07 |
| 2011/0138730 A1 * | 6/2011 | Nies | ................. | F03D 13/25 52/745.18 |
| 2011/0140447 A1 * | 6/2011 | Paura | ................. | F03D 13/20 290/55 |
| 2011/0154777 A1 * | 6/2011 | Bagepalli | ................. | F03D 13/20 52/849 |
| 2013/0038063 A1 * | 2/2013 | Tawil | ................. | F03B 13/20 417/331 |
| 2013/0052015 A1 * | 2/2013 | Velund | ................. | F03D 13/25 416/85 |
| 2013/0243531 A1 * | 9/2013 | Fernandez Gomez | . | F03D 13/22 405/207 |
| 2013/0251942 A1 * | 9/2013 | Azimi | ................. | C04B 35/50 420/416 |
| 2014/0196631 A1 * | 7/2014 | McDaniel | ................. | C09D 189/00 524/590 |
| 2015/0111063 A1 * | 4/2015 | Khan | ................. | C23C 14/025 427/419.7 |
| 2015/0292175 A1 * | 10/2015 | Kramer | ................. | E02B 17/0004 228/101 |

FOREIGN PATENT DOCUMENTS

| | | | |
|---|---|---|---|
| WO | 2006/005323 A1 | | 1/2006 |
| WO | WO 2006005323 | * | 1/2006 |
| WO | 2017/178657 A1 | | 10/2017 |

OTHER PUBLICATIONS

International Search Report dated Jan. 12, 2018 issued in corresponding International Application No. PCT/NL2017/050665.
Andrew Rudgley et al., "Corrosion and fouling prevention Offshore Wind", offshorewind.biz Jun. 21, 2013, XP055389199, Retrieved from the Internet: URL:http://www.offshorewind.biz/2013/06/21/corrosion-and-fouling-prevention/ [retrieved on Jul. 10, 2017] 3 pgs.

* cited by examiner

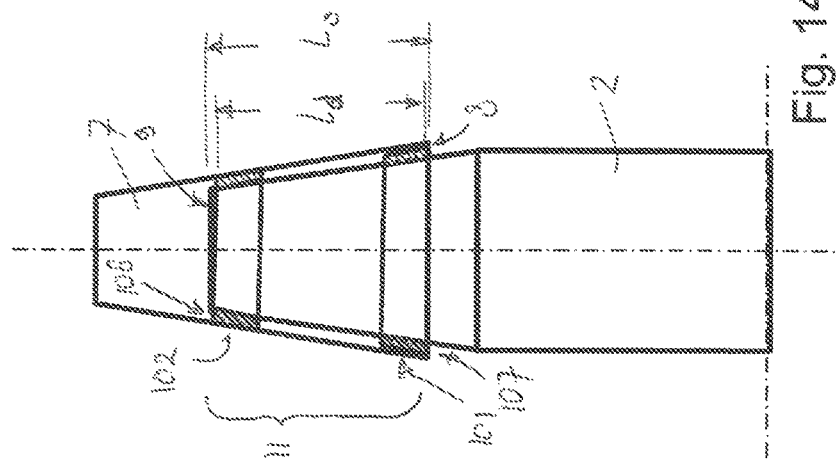
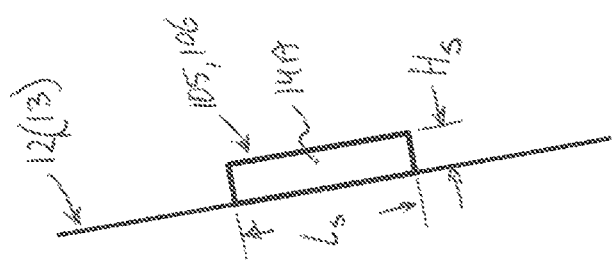
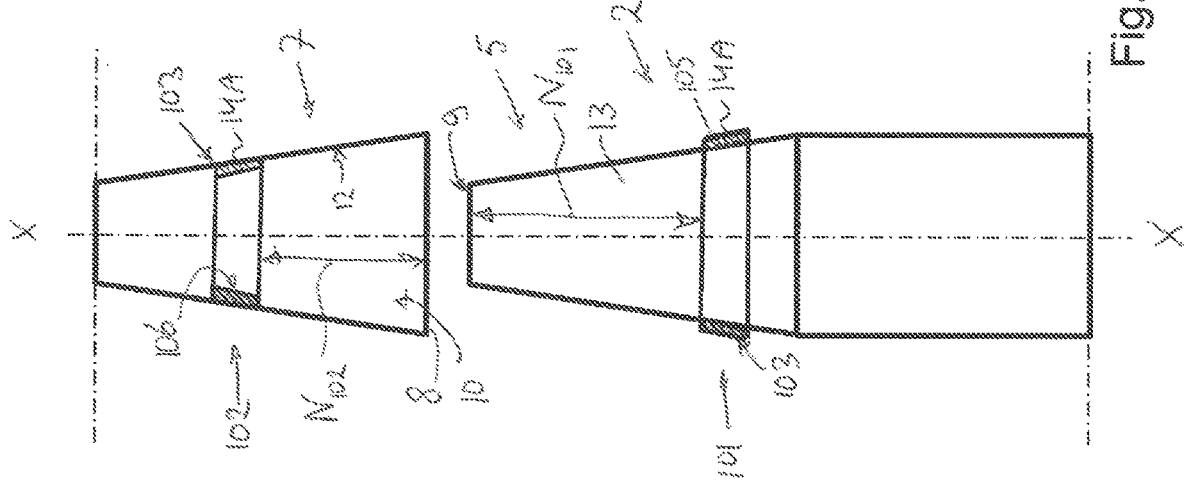

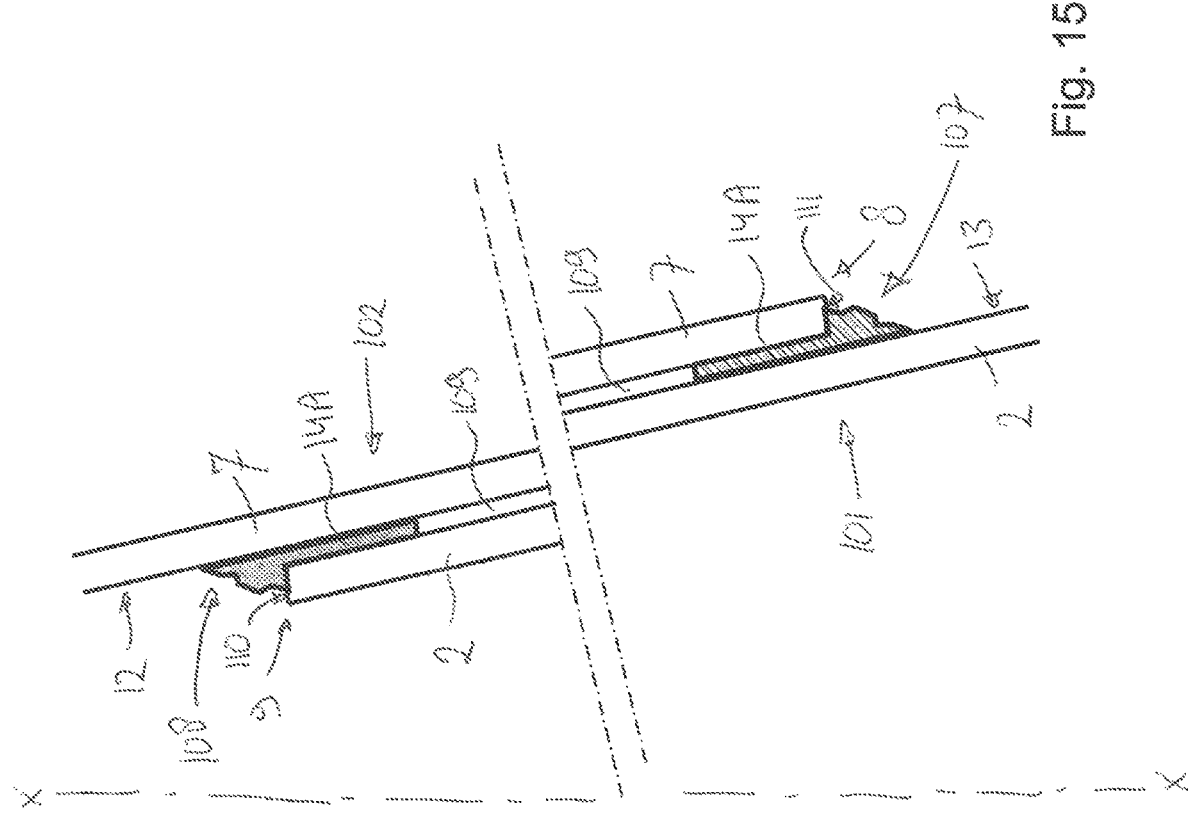

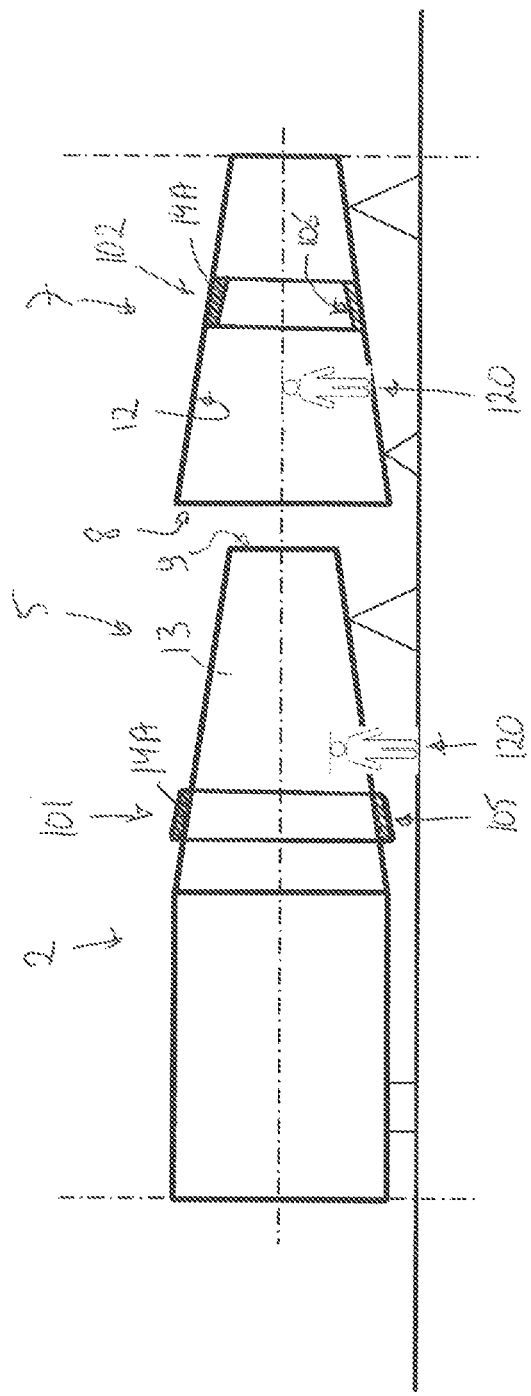

OFFSHORE STRUCTURE COMPRISING A COATED SLIP JOINT AND METHOD FOR FORMING THE SAME

CROSS-REFERENCE TO RELATED APPLICATIONS

This is the U.S. National Stage of PCT/NL2017/050665, filed Oct. 10, 2017, which in turn claims priority to Netherlands Application No. 2017594, filed Oct. 10, 2016, the contents of each of these applications being incorporated herein by reference in their entireties.

The invention relates to an offshore structure comprising a slip joint.

In offshore structures slip joints are used for mounting off-shore elements on foundation piles, such as monopiles drive into a sea bed. This means generally that an offshore element having a hollow part is slipped over a truncated conical shaped upper end of a pile. The hollow part has an inner surface which is shaped according to said conical upper end, such that it can be slipped over said end and forced onto said end by force of gravity. Such joints rely on gravity and friction between the outer surface of said upper end of the pile and the inner surface of the offshore element for maintaining the offshore element in position, even at high loads working on the offshore element and foundation, such as for example due to waves and/or wind. Slip joints may be suitable for easy mounting but removal of the off-shore structure from the pile may be difficult. Moreover existing slip joints require extensive and labor intensive maintenance.

There is a need for improving slip joints in offshore structures.

In the present disclosure in one aspect an offshore structure is described, comprising a pile of a foundation and at least one offshore element, mounted on the pile, forming a slip joint. Between an inner surface of the offshore element and an outer surface of the pile an anti-fouling coating can be provided. The coating is chosen for increasing friction between the said two surfaces and/or preventing corrosion of one or both of said surfaces.

In an aspect the coating can provide for an increased surface roughness of the relevant surface of one of the pile and the offshore element. The difference in surface roughness can be increased relative to the surface roughness different between the surfaces as such. In embodiments the coating has a surface roughness higher than the surface roughness of the relevant part of the inner surface of the offshore element and/or of the outer surface of the pile on which said coating has been applied.

In embodiments the coating can be provided as a foil, preferably an adhesive foil, such as a self-adhesive foil.

In embodiments the coating can comprise a layer comprising fibers on a carrier foil. The fibers can be embedded in a resin or in another carrier system. Such resin can be an acrylic, especially a cured acrylic.

In an aspect the disclosure discloses a slip joint in which a coating is applied on the outer surface of the pile, especially on a truncated conical part of the pile, wherein the coating is chosen for increasing friction between the said two surfaces and/or preventing corrosion of one or both of said surfaces. In an aspect the disclosure discloses a slip joint in which a coating is applied to the inner surface of the offshore element, wherein the coating is chosen for increasing friction between the said two surfaces and/or preventing corrosion of one or both of said surfaces. In embodiments the coating can be provided on both surfaces.

In embodiments the coating is free of organotin compounds. Organotin compounds are carbon compounds containing tin.

In embodiments the offshore element can be a tower. In embodiments the offshore element can be a platform.

In an aspect of the disclosure an offshore structure is provided wherein a platform is mounted on a pile by a first slip joint and a tower is mounted on the pile by a second slip joint. A coating as disclosed can be provided between the platform and the pile and/or between the tower and the pile. In this disclosure a tower has to be understood as including but not limited to windmills and legs of an offshore structure.

In an aspect the disclosure can be characterized in an offshore pile having a top end portion provided with an anti-fouling coating. A pile should in this disclosure at least be understood as meaning a pile for forming a foundation element for an offshore structure, which pile can be massive or can be hollow and can be mounted in a sea or ocean bed, for example by driving it into such sea or ocean bed. A pile can be made of any suitable material, including but not limited to concrete, metal or plastics, such as reinforced plastics, or combinations thereof. A pile can be a monopile or can be a compiled pile.

In an aspect of the disclosure a method for forming an offshore structure can comprise fitting a lower end of at least one offshore element over a top end of an offshore foundation pile, forming a slip joint, wherein a surface area at the top end of the pile and/or a surface area of an inner surface of the offshore element is provided with an anti-fouling coating prior to placing said offshore element.

The coating can be applied in any suitable way. In a suitable embodiment the coating is applied by a film coating. Such film coating can be applied as an adhesive film, such as a film having a pressure sensitive adhesive. Such film coating can be applied by using a bonding agent applied to the film and/or surface on which the coating is to be applied.

In embodiments the coating can be formed at least partly on the surface on which the coating is to be provided. For example by providing a resin on said surface and providing fibers in and/or on said resin.

In embodiments the coating can be applied such that at least overlapping surfaces of the top end of the pile and the at least one offshore element are separated from each other by said coating.

In this disclosure an offshore element should be understood as including offshore structures, including but not limited to towers and platforms of combinations thereof.

Embodiments of an offshore structure and method will be discussed hereafter, with reference to the drawings, which are only given by way of example and should by no means be understood as limiting the scope of the disclosure or protection in any way or form. These examples are given in order to better understand the invention and not restrictive. In these drawings:

FIG. 12 shows schematically in cross section an alternative embodiment part of a foundation pile and a tower to be placed thereon;

FIG. 13 shows schematically a part of a seal prior to mounting the tower onto the pile;

FIG. 14 shows the pile and tower of FIG. 12 in assembled state;

Figure 3:
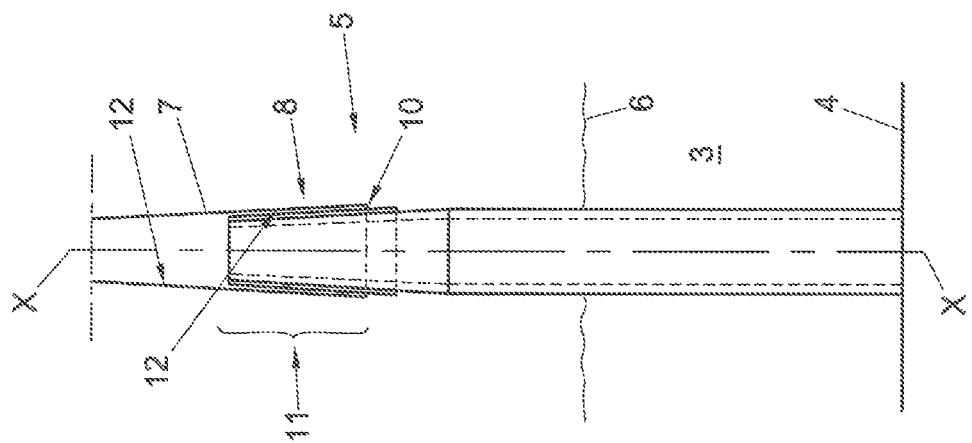
FIG. 3 shows schematically a tower being placed on a pile for forming an offshore structure of FIG. 1.

FIG. 15 schematically shows part of an upper and lower part of a joint between a pile and a tower of FIG. 12-14; and FIG. 16 shows schematically part of the tower and pile in a horizontal position, in an embodiment during the steps of providing the substance for sealing and/or coating.

In this description the same or similar parts will be referred to by the same or similar reference signs. Though different embodiments or parts thereof are shown also combinations of embodiments of the container and the valve and the valve assembly should be considered having been disclosed herein.

In this description an offshore structure should be understood as at least including any structure founded in or on the bottom of a body of water, including but not limited to the bottom of a sea or ocean. In this disclosure an offshore structure can for example be a wind mill, drilling rig, electrical unit such as a transformer, or the like, preferably supported at least partly above a water surface of the body of water where the structure is positioned.

In this description coating of a surface should be understood as at least encompassing providing a coating layer such as a coating substance or coating film covering at least part of said surface. In preferred embodiments the coating will form a substantially closed layer over at least overlapping areas of the pile and the relevant part of the offshore element, such as a mounting part of a platform or tower.

In this description a platform mounted or to be mounted on a pile as disclosed should be understood as meaning at least but not limited to a platform surrounding at least partly the pile and/or a lower portion of a tower or leg mounted on the pile. Such platform can be suitable for landing of a vessel for transferring people and/or products to and from the offshore structure, and/or for people to move around the pile and/or tower or leg mounted on the pile safely.

This description discloses the use of a coating provided on an outer surface portion of the pile and/or an inner surface portion of the offshore element mounted on or to be mounted on the pile. Such coating can be an anti-fouling coating and/or anti-corrosion coating. Such coating can have a surface roughness higher than the surface roughness of the surface portion on which the coating is to be provided. A coating according to the disclosure is advantageously provided as a foil, which can also be referred to for example as film, sheet or the like wording. The coating can for example be formed by a self-adhesive foil, for example a foil provided with a pressure sensitive adhesive, or by a foil that can be adhered to the relevant surface by an adhesive. Alternatively a coating can be provided as a coating layer for example sprayed, rolled, dipped or brushed onto said surface. During application the coating can be formed, for example by providing a resin or such carrier onto said surface and then providing fibers on and/or into said resin. The coating can be machined after application in order to for example increasing the surface roughness.

In the embodiments shown as an example a tower, especially a tower of a windmill is provided on a pile. Alternatively the tower can also be a tower or leg of another offshore element, such as an oil rig, power station or the like.

Figure 1:
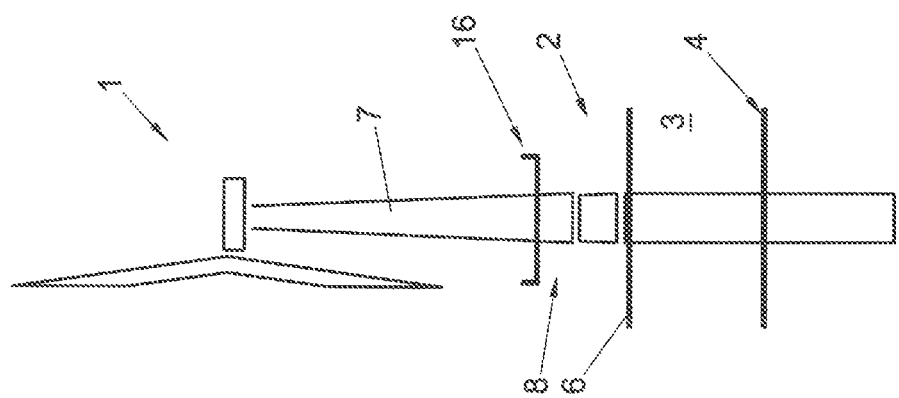
FIG. 1 shows schematically an embodiment of an offshore structure, assembled, comprising a foundation pile and a tower of a wind mill.

FIG. 1 shows schematically a windmill 1 mounted on a pile 2 placed offshore in a body of water 3. The body of water 3 can for example be a sea or ocean. The pile 2 has been driven into the bottom 4 of the body of water 3 in a suitable manner, such that at least an upper portion 5 extends above the surface 6 of the water 3. The surface 6 of water 3 is to be understood as regarded when the surface 6 is substantially flat, without waves. The windmill 1 has a tower 7 which has a lower end 8 fitted over the upper end 9 of the pile 2. The pile 2 and a tower 7 mounted thereon have parallel, preferably collinear longitudinal axis X-X. The pile 2 has a substantially circular cross section, but can have a different cross section, such as but not limited to square, hexagonal, oblong, multi sided or the like.

In the embodiments shown the upper end 5 of the pile 2 has a substantially truncated cone shape. The lower end 8 of the tower 7 has an opening 10 opening in axial direction, having an internal shape and configuration corresponding to at least part of the upper end 5 of the pile 2. Thus the tower 7 can be fitted with the opening 10 over said end 5 of the pile 2 to form a slip joint 11. The slip joint 11 is formed with a coating layer 14 between an inner surface area 12 of the opening 10 and an outer surface area 13 of the pile 2.

Figure 2:
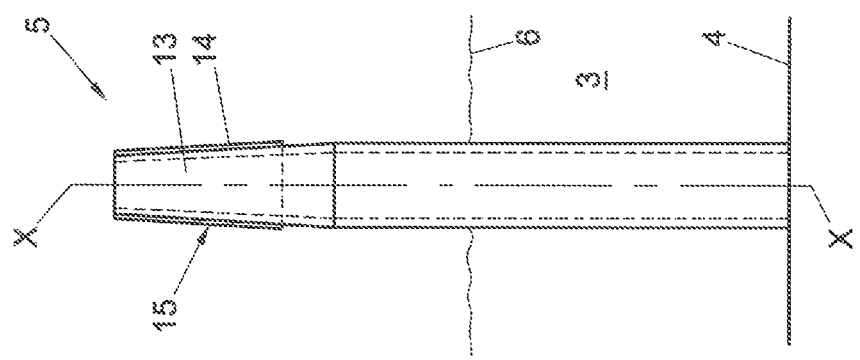
FIG. 2 shows schematically a foundation pile for an embodiment of FIG. 1.

FIG. 2 schematically shows a pile 2, which generally can be made of metal, such as steel. The longitudinal axis X-X extends substantially vertical, having said truncated upper end 5. The upper end 5 has an outer surface area 13 sloping relative to the longitudinal axis X-X. A coating layer 14 is provided on the said surface area 13, in this embodiment forming a substantially closed covering of said surface area 13. In the embodiment shown the coating layer 14 has been applied as a foil, adhered to the said surface area 13 by an adhesive. The adhesive can be a pressure sensitive adhesive, for example as a layer of such adhesive provided at a back of said foil.

The coating layer 14 can in embodiments have a surface 15 at the side opposite the surface area 13, which surface 15 can have a surface roughness higher than that of the surface area 13. This will increase friction between the tower 7 and the pile 2. In embodiments the coating layer can comprise a resin with fibers embedded therein. The resin can for example be an acrylic resin. The fibers can be plastic fibers, for example nylon fibers. The resin and fibers can be carried on a carrier, for example a plastic carrier, such as but not limited to a polyester carrier. Prior to adhering such coating 14 to the surface area 13 a tie coat can be provided on the surface area 13, for example an epoxy or vinyl primer. The coating layer 14 can have a small thickness, for example between a few µm and a few mm, preferably about one mm or less. Thin coating layer has an advantage since it will limit or prevent the possibility of lateral or angular movement of the tower 7 or platform 16, as will be discussed, relative to the pile 2. A coating 14 as provided is free of toxic components such as organotin compounds.

In embodiments instead of or additional to providing a coating layer 14 on the surface area 13 of the pile 2 such coating layer can be provided on an inner surface area 12 of the opening 10 in the tower 7 or of a platform 16.

In the present disclosure the coating 14 can be an anti-fouling foil as provided by the firm Micanti, The Netherlands.

In the present disclosure the slip joint 11 is formed substantially by force of gravity acting on the offshore element, such as the tower 7 and/or platform 16, as can be seen in e.g. FIG. 3.

Surprisingly using a coating 14 as disclosed in a slip joint of an offshore structure can have the advantage that the friction between the pile 2 and the structure element supported thereon, such as a tower 7 or platform 16, can be increased in a simple and effective manner, improving the connection between the pile 2 and said structure. Moreover in embodiments the coating can prevent or at least reduce corrosion of the surfaces 12 and/or 13. The coating can additionally make release of the slip joint easier than when forming such slip joint between the surface areas 12, 13 directly, without said coating 14. It has been found that using such coating can provide for a firm connecting over the slip joint without the coating making release of the slip joint after a period of time, for example after several years, more difficult than when forming the slip joint traditionally between the surface areas 12, 13 directly.

Without wanting to be bound to any theory, it is believed that the coating 14 prevents corrosion of the relevant surfaces and/or stick slip of the said surface areas when releasing the structure element from the pile and/or providing the possibility of creating small relative movement of the structure element relative to the pile in a direction other than in the axial direction prior to and/or during such release.

As can be seen in e.g. FIG. 3 the coating 14 can extend further along the surface 13 and 12 than the tower 7, covering also part of said surface area 13 or the top 5 of the pile 2 below the lower end 8 of the tower 2.

Figure 4:
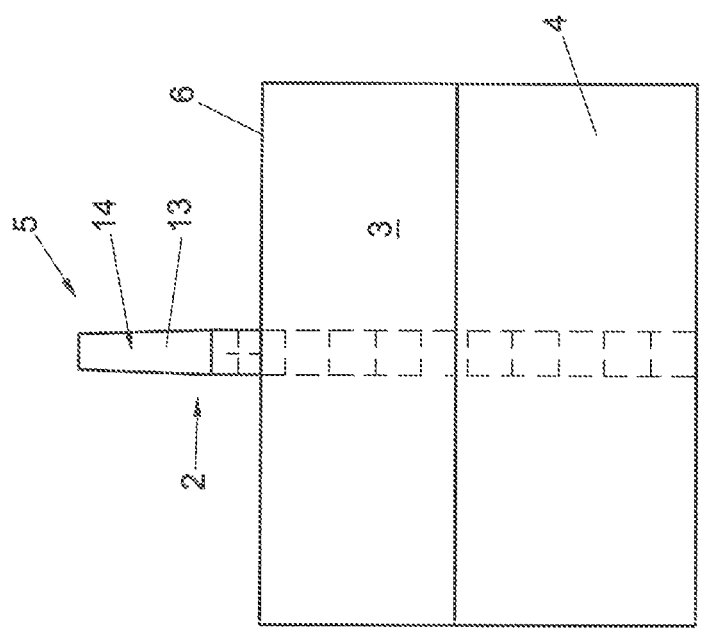
Figure 7:
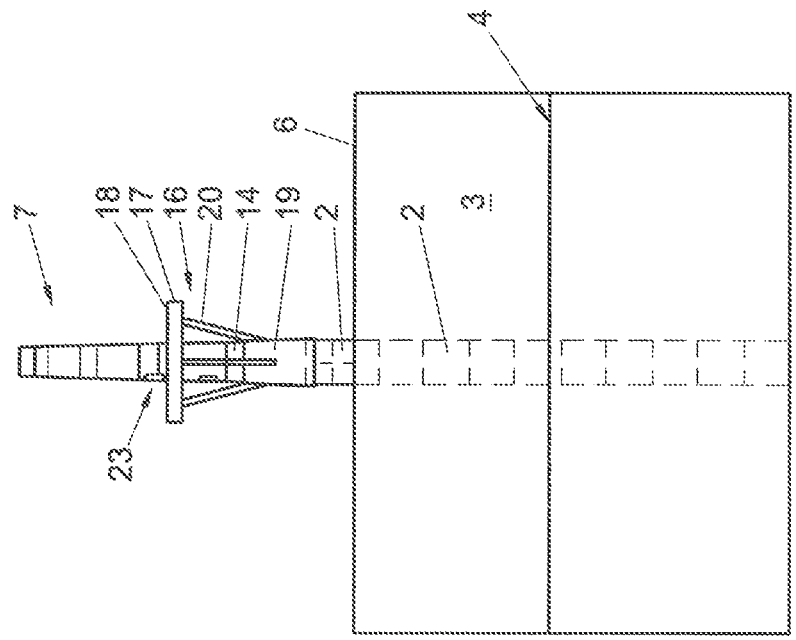
Figure 8:
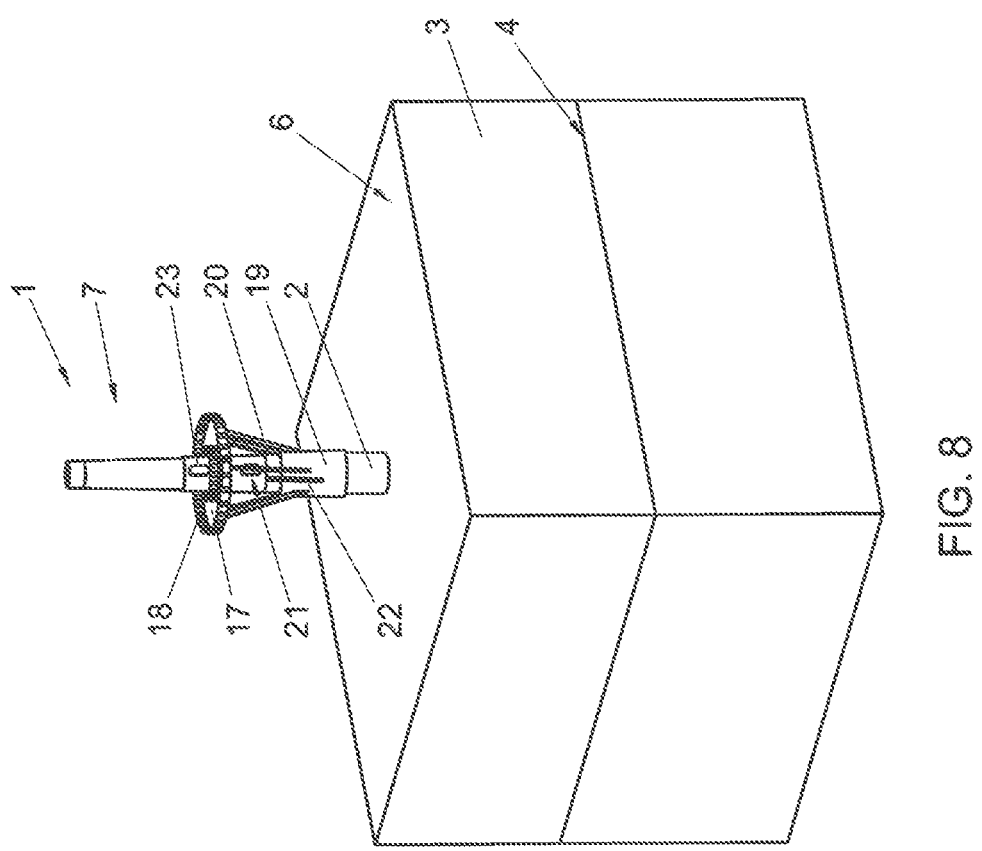
FIG. 8 shows a perspective view of part of a windmill founded on a foundation comprising a slip joint.
Figure 10:
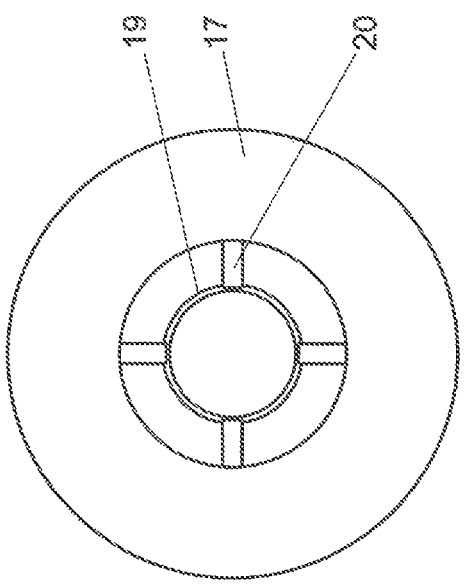
FIG. 10 shows the platform of FIG. 8 in top view.
Figure 9:
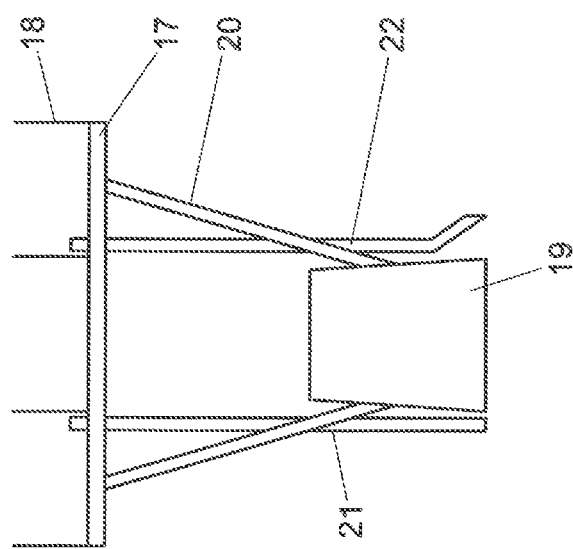
FIG. 9 shows schematically in side view a platform.

In FIG. 4-7 in four steps the mounting of an offshore structure element such as a tower 7 onto a pile 2 is shown, in this embodiment with a platform 16. With respect to positioning of the tower 7 or such element on the pile this can be similar to or the same as discussed here above. In this embodiment additionally a platform 16 is placed on the pile 2, forming a second slip joint 11A. The platform 16 can for example be as shown in FIGS. 9 and 10. FIG. 4 shows a pile 2 positioned in a vertical position on and/or in bottom of a body of water 3 as discussed before. FIG. 8 shows schematically a lower end of the tower 7 mounted on a pile 2 using a slip joint 11, as well as a platform 16, after mounting.

Figure 5:
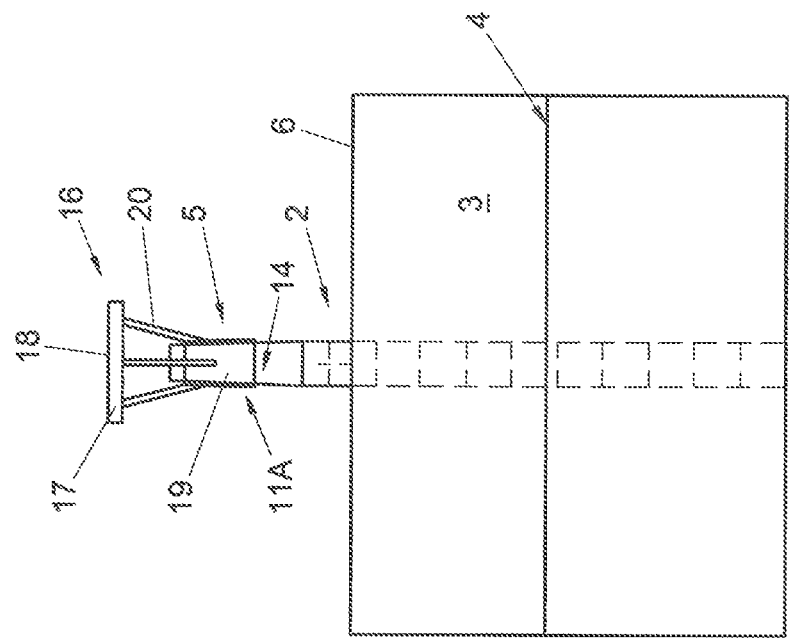
FIG. 4-7 show schematically in four steps the forming of an offshore structure according to the disclosure, comprising a platform and a tower.
Figure 6:
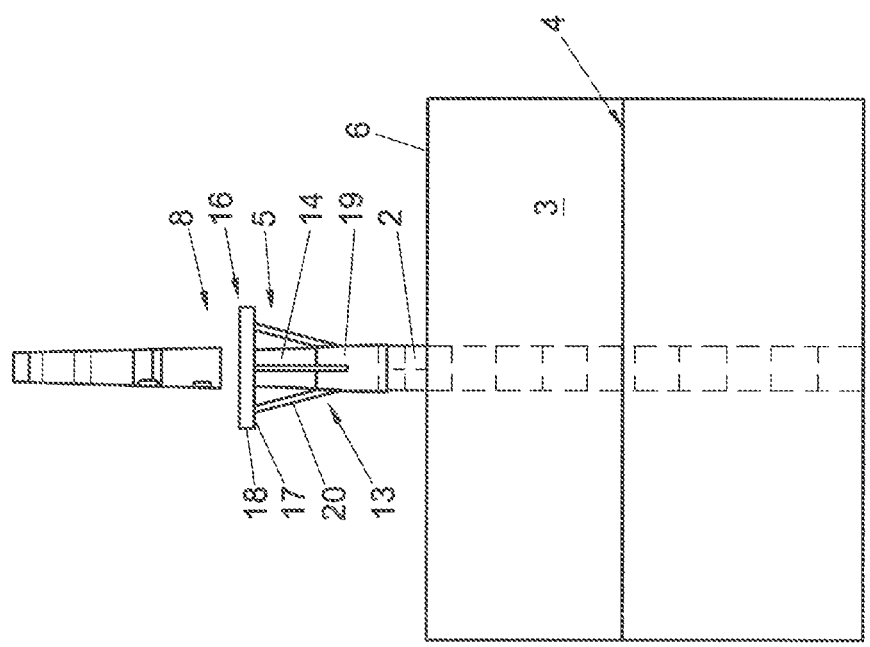

In this embodiment the platform 16 comprises a substantially ring shaped walking surface 17, provided with a railing 18 and supported on a ring element 19 by supports 20. The ring element 19 in this embodiment is a substantially truncated cone shaped bushing or pipe, having an internal channel with a shape and dimension substantially complementary to part of the surface area 13 of the pile 2, such that the ring element 19 can be slid onto the upper end 5 of the pile to a relatively low position on said pile 2, as shown in FIG. 5, such that the tower 7 or such element can be slid onto the upper end 5 above said ring element 19, as shown in FIGS. 6 and 7. Preferably the ring element 19 is in this position supported on the coating layer 14 too.

The platform 16 can be provided with a mooring provision 21, such as one or more mooring eyes, bollards, slings or the like. Moreover the platform 16 can be provided with a ladder 22 or such provision for persons to use to mount and/or dismount the platform 16. Moreover the platform 16 and especially the walking surface 17 can be provided for allowing access to an entrance 23 to the offshore element such as the tower 7 and/or for example stairs or an elevator.

After a period of use of the offshore structure, for example after a number of years, the offshore element such as a tower 7 and, if applicable, a platform 16 can be removed again surprisingly easily by lifting the element such as the tower 7 or platform 16 from the pile 2, by pulling it upward substantially vertically, along the axis X-X. It has been found that the slip joint or joints are, with respect to connecting force, at least substantially similar to that as formed directly between the surface areas 12, 13 without the coating 14, or even stronger, whereas release of the slip joint after use has been found to be easier. Moreover it has been found that the connection and adjacent parts of the pile 2 are better protected against corrosion. This is especially important when the slip joint is positioned above the water surface, positioning the slip joint and its adjacent surface area in an environment which is especially corrosive.

In embodiments a filler 30 can be used in between the surface 15 of the coating 14 applied to a first of the surface areas 12, 13 of the first of the pile 2 and tower 7 and/or platform 16 and the adjacent part of the surface area 13, 12 of the other one of the tower 7 and/or platform 16 and pile 2. It has been found that, due to at least the difference in surface roughness between the surface 15 and the said adjacent surface area 12, 13 small channels are formed between the coating and the said adjacent surface area 12, 13. These channels will allow flow of fluid in between the mating surfaces 15 and 12 or 13, for example free flow or flow by capillary action. In embodiments these channels are used to introduce a fluid, especially a curing fluid into at least part of said channels, filling said at least part of the channels, such that after curing said channels are blocked for fluid flow, such as flow of water or air. The curing fluid can for example be a two component curing composition, for example but not limited to a composition of a setting resin such as a thermosetting resin and a curing agent for said thermosetting agent, e.g., an unsaturated polyester resin, and a-curing agent for the resin, or a curable resin composition comprising an epoxy acrylate resin composed mainly of an ester of an epoxy resin with at least one organic acid selected from the group consisting of acrylic acid and methacrylic acid, and a reactive monomer, said curing agent comprising an organic peroxide. Compositions used can for example be but are not limited to polyester, vinyl ester or epoxy resin based compositions, known in the art, which are after curing sea water resistant. The filler can also be formed by a single component curable for example by air, heat, moisture or any suitable manner.

Figure 11:
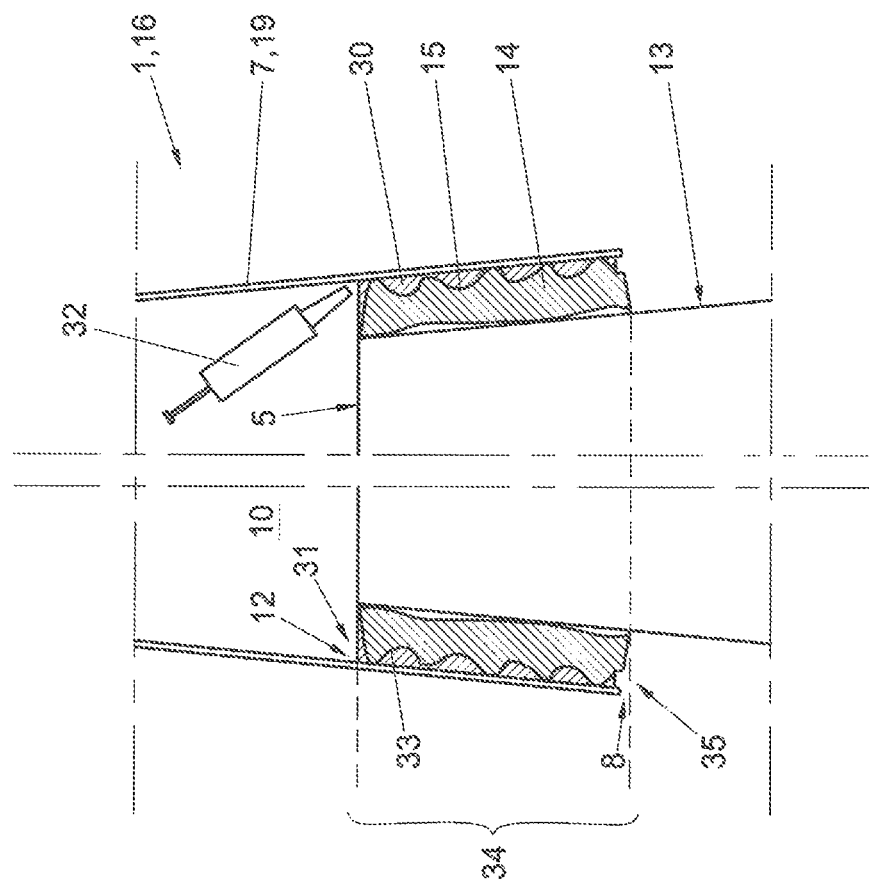
FIG. 11 shows schematically in cross section part of a slip joint with a filler.

In embodiments the curing composition or filler 30 is injected into the channels from an upper end 31 of the coating layer 14, for example by pressure injection or by gravity and/or capillary action. For example as shown in FIG. 11, not to scale, for a slip joint in which the coating is applied to the outer surface area 13 of the pile 2, wherein the said adjacent surface area is the inner surface area 12 of the tower 7. Obviously this could also be inversed or a coating 14 could be applied to both surface areas 12, 13. In this embodiment a curing composition or filler 30 has been poured or injection from the upper end 31, as schematically indicated by the injector 32. Any other suitable pouring method or injection method can be used, such as but not limited to pouring the composition onto the upper end 31 or injecting the composition directly into the channels 33 formed by at least the surface roughness of the surface 15. Inside the channels 33 the filler 30 is then allowed to cure and/or set to fill the channels 33 at least partly. In embodiments the filler 30 may, at least after curing, adhere to the surface 15 and/or to the adjacent relevant surface area 12, 13. In embodiments the filler 30 may not adhere to either or both of said surfaces 15 and 12 or 13, for example by specific choice of the coating 14 and filler 30 and/or by applying a coating onto the relevant surface or surfaces 15, and 12 or 13, preventing such adhering.

In the embodiment shown the filler has formed a closed ring around at least part of the coating layer 14, especially filling substantially all channels 33 at least in the overlapping area 34 between the tower 7 and the pile 2. Preferably such that both at the upper end 31 and the lower end 35 of the slip joint 11 a closed ring of said filler 30 is formed, preventing air and/or (sea) water to enter into said slip joint 11. This will further prevent corrosion of the relevant surface areas. Alternatively the filler may be provided such that it will only fill part of the channels 33, for example by ring injection from the lower end 35 or from the top end 31 or both, or by filling only a section of the cross section, such as for example strips of said filler extending in a substantially vertical direction, leaving channels open between the top and bottom ends 31, 35.

Using a filler as described filling at least ring-wise part of the channels of the slip joint 11, may prevent spillage of fluids such as but not limited to oil, hydraulic fluids, gasoline products, lubricants and the like which might be spilled inside the tower and could other wise spill into the water surrounding the pile by seeping through the slip joint 11. The filler may moreover add to the mechanical strength and durability of the slip joint 11.

Similarly the slip joint 11A between a pile 2 and a platform 16 can be provided with a filler 30.

A filler or filler composition 30 can be applied after forming the slip joint 11, or can be provided during forming thereof, for example by coating a relevant surface area, for example area 12 or 15 with the filler or filler composition 30 prior, preferably directly prior to placing the tower 7 or platform 16 onto the pile 2. This can be advantageous for example when the composition or filler 30 has a relatively high viscosity or cannot flow into the channels sufficiently by capillary action, for example because of chemical incompatibility.

FIG. 12-15 show schematically a tower 7, for example of a windmill 1, mounted on a pile 2 placed offshore in a body of water 3. The body of water 3 can for example be a sea or ocean. The tower 7 again has a lower end 8 fitted over the upper end 9 of the pile 2.

In the embodiments shown again the upper end 5 of the pile 2 has a substantially truncated cone shape. The lower end 8 of the tower 7 has an opening 10 opening in axial direction, having an internal shape and configuration corresponding to at least part of the upper end 5 of the pile 2. Thus the tower 7 can be fitted with the opening 10 over said end 5 of the pile 2 to form the slip joint 11. In this embodiment the slip joint 11 is formed by at least two separate areas 101, 102 of a substance 14A, which may be similar to or different from a coating 14 as discussed, between the inner surface area 12 of the opening 10 and an outer surface area 13 of the pile 2. Said surface areas 12, 13 form surface areas sloping relative to the vertical axis X-X and/or relative to each other.

In this embodiment in stead of a single area containing the coating 14 at least two areas 101, 102 comprising a substance 14A are provided, separate from each other seen in a longitudinal direction of the pile 2 and tower 7, i.e. in the direction of the axis X-X. In the embodiment shown, a first area 101 is disclosed on the pile 2, spaced apart over a distance $N_{101}$ from an upper end 9 of the pile 2 and the second area 102 is disclosed within the tower 7, spaced apart over a distance $N_{102}$ from a lower end 8 of the tower 7. The two areas 101, 102 are positioned such that when the tower 7 is mounted onto the pile 2 in overlapping fashion as discussed before, the first area 101 is close to or next to the lower end 8 of the tower 7 and the second area 102 is close to or next to the upper end 9 of the pile. In the embodiment shown by way of example the areas 101 and 102 are provided such that they are in the assembled position enclosed between the upper end 9 of the pile 2 and the tower 7 and between the lower end 8 of the tower 7 and the pile 2, separated over a length $L_d$ substantially equal to the length Lo of overlap when joined, which length Lo can for example be in the order of between about 1 and 10 m, for example between 1 and 5 m.

In the embodiment disclosed in FIG. 12-15 the substance 14A can be a coating 14 as disclosed previously. In the embodiment disclosed the substance 14A can be an adhesive material, such as a self-adhesive material. In the embodiment disclosed the substance 14A can be a viscoelastic material. Viscoelasticity is to be understood as at least meaning but not limited to the property of materials that exhibit both viscous and elastic characteristics when undergoing deformation. In embodiments the substance 14A can be such that upon applying it to a relevant surface of the pile 2 or tower 7 it will enter at least in part of said surface, for example into pores or interstitial openings in such surface. In embodiments the substance 14A can be a self-adhesive, visco-elastic material.

As can be see in for example FIG. 13 the substance 14A, when applied to the relevant surface 12, 13, i.e. the areas 101, 102, can have a height Hs above the relevant surface 12, 13, i.e. a height measured in a direction substantially perpendicular to the said surface 12, 13, which is substantial, for example a height Hs of more than 1 mm, for example between 1 and 30 mm, such as for example between 1 and 10 mm. In embodiments the height Hs can be between about 2 and 5 mm, such as between 2 and 4 mm on average. A substance 14A can be applied with a length Ls measured parallel to said surface 12, 13 which can be substantially longer than the height Hs. The length Ls can for example be more than 10 mm, when the height is less than 10 mm. The length Ls can for example be 30 mm when the height is less than 30 mm. The length Ls can for example be between 30 and 500 mm, for example between 30 and 300 mm, such as for example between 75 and 250 mm. In embodiments the length Ls can be between 100 and 200 mm, for example about 150 mm. In embodiments, as for example shown in FIG. 12-15, the substance 14A can be provided as substantially forming a ring 103 around the pile 2 and/or within the tower 7, on or forming the respective areas 101, 102. Such ring 103 can have the discussed height Hs and length Ls.

In embodiments the substance 14A as discussed can be a sealing material. In embodiments the sealing material that is used can be a mouldable, self-adhesive and viscoelastic material. It preferably is watertight and gastight according to NEN 2768 qualifications. The sealing material can be such that it can be applied manually without the need of tools, primers or any pre-treatment of the surface. The material used can have a low surface tension and liquid-like behaviour provide good impregnation of the surface on which it is applied. Preferably such that excellent wetting is achieved on steel surfaces of a pile 2 and/or a tower 7 as well as on polymers like PE, PP and FBE. Preferably such material can have these properties persist until a −20 degrees C. (C°) environment without tearing, breaking or the build-up of internal stresses. In embodiments the material used as or for said substance can be Stopaq®, especially Stopaq® paste, provided by Stopaq BV, The Netherlands, or a similar sealant.

In embodiments more than one ring 103 can be provided on the pile 2 and/or within the tower 7, spaced apart such that each ring 103 on the pile is relatively close to the upper end 8 and/or each ring 103 in the tower 7 is relatively close to the lower end 9 of the tower 7.

In embodiments the substance 14A such as the sealing material can be applied onto the pile 2 and/or tower 7 when the relevant pile 2 and/or tower 7 are in a substantially horizontal position, i.e. having the longitudinal axis X-X extending horizontally, for example on shore, for example as shown in FIG. 16. Then the pile 2 and tower 7 can be shipped to a location, where the pile 2 can be driven into the sea bed 4 or mounted in a different manner in a vertical position, as for example shown in FIG. 2. Then the tower 7 can be lifted and lowered onto the pile 2, as discussed before. The lower end 8 of the tower 7 can be lowered easily, without the risk of damaging the substance 14A of either surface area 101, 102. Only when the tower 7 has been lowered almost to an end position of maximal overlap Lo the lower end 8 of the tower 7 will slide over an outward facing surface 105 of the substance 14A at the lower area 101, coming into contact with an inner surface area of the tower, whereas an inward facing surface 106 of the substance 14A on the second area 102 will be brought into contact with the outer surface of the pile 2 near the upper end 9 thereof. Sliding the tower further down the substances 14A in the said areas 101, 102 will be compressed and party deformed, forming two spaced apart seals 107, 108 between the tower 7 and the pile 2, forming a slip joint 11.

As is schematically shown in FIG. 15, the substances 14A can be deformed such that part of the substance 14A on the first area 101 will be pushed partly outside the lower end 8 of the tower 7, effectively forming a water tight and gas tight first, lower seal 107. Similarly preferably the substance in the second area 102 is partly pushed upward out onto the upper end 9 of the pile, effectively forming a water and gas tight second, upper seal 108. Preferably the seals 107, 108 are formed such that the tower 7 can be lifted back off the pile if needed.

A platform as for example shown in FIGS. 9 and 10 can be mounted onto the pile 2 or tower 7 using a similar construction and method of two spaced apart seals.

In the embodiment shown the substance 14A is provided as a closed ring 103 on the pile 2 and in the tower 7. However, similarly the substance 14A can be provided differently, for example as patches. In embodiments the substance 14A can be provided for example as a strip of material having sufficient internal cohesion to be able to be draped onto the relevant surface area 101, 102. In embodiments the substance can be provided for example as a paste which can be delivered onto the relevant surface area 101, 102 for example using an injector 32 as for example shown in FIG. 11. In embodiments the substance 14A can be sufficiently viscous to be applied to a relevant surface area using a brush or roller. In embodiments the substance can be visco elastic such that it can be kneaded and can be applied by hand, for example having a paste or gum like consistency. Any other suitable method for applying the substance 14A to the relevant areas 101 and 102 can be used.

A tower 7 can be mounted to a pile 2 using a method for example comprising the following steps.

A pile 2 and a tower 7 are manufactured on shore, for example supported in a substantially horizontal position, i.e. with the longitudinal axis X-X substantially horizontally, as for example shown in FIG. 16. Preferably in this position the substance 14A is applied to at least one and preferably both areas 101, 102. When the pile 2 and/or tower 7 are in a horizontal position when applying the substance 14A, the areas 101 and/or 102 can be reached by an operator 120 relatively easily, for example using a ladder or scaffolding, and for example by entering the relevant part of the tower 7. This enables easy and well controlled applying of the substance 14A in a well controlled manner. Especially when applying on shore, for example reducing possible influences of for example weather conditions.

After application of the substance 14A to the areas 101 and 102, the pile 2 and tower 7 can be loaded onto an appropriate vessel or vessels, to be shipped to a location for installing the pile 2 and tower 7, for example as discussed before.

Since the first area 101 is provided on the pile 2 spaced well apart from the upper end 9 thereof, the pile can be lifted easily by engaging the upper end above said area 101. Moreover, the pile can be driven into the bottom 4 as discussed before, for example by applying a force onto the upper end 9 of the pile 2, without risk of damaging the substance 14A provided on the first area 101.

Since the second area 102 is provided inside the tower 7, the tower 7 can be manipulated easily without running the risk of damaging the substance 14A applied to the second surface area 102.

The tower 7 can be mounted onto the pile 2 by lifting it in a vertical position to a position above the upper end 9 of the pile 2, and then lowering it onto the pile 2, as discussed before, forming a slip joint 11. Since the first area 101 is provided relatively far below the upper end 9 of the pile and the second area 102 is provided relatively high above the lower end 8 of the tower 7, contact between the pile 2 and the substance 14A on the second area 102 and contact between the tower 7 and the substance 14A on the first area 101 is prevented until the tower 7 has been lowered onto the pile 2 over a substantial distance, for example at least half of the length Lo of the overlap of the slip joint 11 when completed, for example at least 75% of said length Lo. In embodiments such contact occurs only after lowering the tower over the pile over a distance substantially equal to said length Lo minus the length Ls of the substance 14A applied onto at least one of the areas 101, 102.

When lowering the tower 7 further onto the pile 2, contact will be established between the outer surface 105 of the substance 14A on the first area and the inner surface of the tower 7, and between the outer surface 106 of the substance in the second area 102 and the outer surface of the pile 2. Due to the substantial conical shape of the relevant surfaces of the pile 2 and tower 7, further lowering of the tower 7 will increase friction between said outer surfaces 105 and 106 and the surfaces mating therewith, such that the substance will be pushed further against the relevant opposing surfaces of the tower 7 and pile 2, at the same time dragging at least part of the substance 14A along said surfaces, thus forming the seals 107, 108 as, by way of example, shown in FIG. 15.

Preferably the substance 14A will seal off the space 109 enclosed between said opposing surfaces of the tower 7 and pile 2, between the upper and lower seals 107, 108. Preferably the seals 107, 108 will cover at least part of the exposed end faces 110, 111 of the upper end 9 of the pile 2 and the lower end of the tower 7 too. Preferably the substance 14A forming the seals 107, 108 will adhere to at least one of the said surfaces of the pile 2 and/or tower 7 that the slip joint 11 can be disengaged relatively easily by pulling the tower 7 back upward, off the pile 2.

In a similar fashion a platform as discussed can be mounted onto the pile and/or tower.

It shall be clear that the substance 14A can also be applied to the pile 2 and/or tower 7 off shore, for example on a transporting vessel or after the pile 2 has been placed in the bottom 4.

In embodiments seals formed by the substance 14A can be combined with a coating 14, specially an anti fouling coating, for example such that said coating extends below the lower seal 107, between the two seals 107, 108 and/or above the upper seal 108.

The embodiments as disclosed are shown by way of example only and should not be construed as limiting the scope of the disclosure. Many variations are possible within the scope of the invention as defined by the claims. For example the offshore element mounted on the pile can be of a different structure and can for example be supported by a series of piles as disclosed. The coating can be formed and/or applied differently. For example the coating can be provided with a different resin or combination of resins. Different types of fibers can be used, for example made of a different material or different materials, or instead of or additional to fibers other materials and element can be provided on or embedded in a resin of the coating, such as for example pallets, flakes or the like, increasing for example surface roughness of the surface 15 of the coating 14. Instead of or additional to a film or foil coating a coating layer 14 can be provided by spraying, rolling, dipping, brushing or the like, for example using a single or multiple component fluid or paste, which may be curable. The surface 15 of the coating layer 14 and/or the surface 105, 106 of the substance 14A can for example be processed, for example after application to the pile and/or tower, for example by machining or etching for manipulating the surface, especially the surface roughness or surface profile. For example dents or grooves can be provided in and/or on the surface 15, 105 and/or 106. A platform 16 can be provided in a different manner and can be formed differently, for example by mounting the walking surface directly on the ring element or integrating them into one artefact. The or each slip joint are shown as formed above the water surface. A slip joint according to the disclosure can however also be formed at or below said water surface.

These and other amendments, including but not limited to combinations of embodiments or parts thereof as disclosed are also considered to have been disclosed within the ambit of the claims.

The invention claimed is:

1. Method for forming an offshore structure, comprising fitting a lower end of at least one offshore element over a top end at an offshore foundation pile that extends along a longitudinal axis in a vertical direction, forming a slip joint in the vertical direction of said longitudinal axis, wherein a surface area of the top end of the offshore foundation pile and/or a surface area of an inner surface of the at least one offshore element is provided with a visco-elastic substance, prior to the fitting of said at least one offshore element onto the offshore foundation pile, wherein the visco-elastic substance is provided on an outer surface area of the offshore foundation pile that is spaced apart from an upper end of the offshore foundation pile and on an inner surface area of the at least one offshore element spaced apart from a lower end of said at least one offshore element.

2. The method according to claim 1, wherein the visco-elastic substance is provided on each of said inner and outer surface areas as a ring.

3. Method for forming an offshore structure, comprising fitting a lower end of at least one offshore element over a top end at an offshore foundation pile that extends along a longitudinal axis in a vertical direction, forming a slip joint in the vertical direction of said longitudinal axis, wherein a surface area of the top end of the offshore foundation pile and/or a surface area of an inner surface of the at least one offshore element is provided with a visco-elastic substance, prior to the fitting of said at least one offshore element onto the offshore foundation pile, wherein the visco-elastic substance is provided on both the offshore foundation pile and the at least one offshore element and wherein the offshore foundation pile and/or the at least one offshore element is provided in a substantially horizontal position during application of the visco-elastic substance.

4. The method according to claim 1, wherein the visco-elastic substance is applied such that overlapping surfaces of the top end of the offshore foundation pile and the at least one offshore element are separated from each other by said visco-elastic substance, such that after mounting of the offshore element a weight of the offshore element is transferred to the offshore foundation pile by the visco-elastic substance.

5. The method according to claim 1, wherein the at least one offshore element comprises a tower, and wherein:
the visco-elastic substance is applied to the outer surface of the offshore foundation pile, such that after forming the slip joint, part of the visco-elastic substance extends below a lower edge of the tower; and
the visco-elastic substance is applied to the inner surface of the tower, such that after forming the slip joint, part of the visco-elastic substance extends above an upper edge of the offshore foundation pile.

6. The method according to claim 1, wherein a first slip joint is formed by directly mounting a platform on the offshore foundation pile and a second slip joint is formed by directly mounting a tower on the offshore foundation pile, both the first slip joint and the second slip joint being provided with said visco-elastic substance, wherein the forming of the second slip joint is above the first slip joint and after the first slip joint is formed.

7. The method according to claim 1, wherein, after forming the slip joint, said inner and outer surface areas provided with said visco-elastic substances are spaced longitudinally apart from each other.

8. The method according to claim 3, wherein the application of the visco-elastic substance is provided while the offshore foundation pile and/or the at least one offshore element is on shore.

9. The method according to claim 6, wherein the platform is first mounted to the off-shore foundation pile, forming the first slip joint, and thereafter the tower is mounted to the off-shore foundation pile, forming the second slip joint, above the first slip joint.

10. Method for forming an offshore structure, comprising fitting a lower end of at least one offshore element over an upper end of an offshore foundation pile, forming a slip joint, wherein a surface area of the upper end of the offshore foundation pile and a surface area of an inner surface of the at least one offshore element is provided with a visco-elastic substance prior to placing said offshore element,
wherein the visco-elastic substance is provided on an outer surface area of the offshore foundation pile spaced apart from the upper end of the offshore foundation pile and on said inner surface area of the at least one offshore element spaced apart from the lower end of said at least one offshore element, such that after forming the slip joint, said surface areas provided with said visco-elastic substances are longitudinally spaced apart from each other.

11. Method for forming an offshore structure, comprising fitting a lower end of at least one offshore element over an upper end of an offshore foundation pile, forming a slip joint, wherein a surface area of the upper end of the offshore foundation pile and a surface area of an inner surface of the at least one offshore element is provided with a visco-elastic substance prior to placing said offshore element,
   wherein the visco-elastic substance is provided on an outer surface area of the offshore foundation pile spaced apart from the upper end of the offshore foundation pile and on said inner surface area of the at least one offshore element spaced apart from the lower end of said at least one offshore element, such that after forming the slip joint, said surface areas provided with said visco-elastic substances are longitudinally spaced apart from each other,
   wherein during the fitting the lower end of the at least one offshore element over the top end of the offshore foundation pile, forming the slip joint, the visco-elastic substances in said surface areas are compressed and partly deformed, forming two spaced apart seals between a tower and the offshore foundation pile, forming the slip joint, and wherein the visco-elastic substances are deformed such that part of the visco-elastic substance on the surface area of the top end of the offshore foundation pile is pushed partly outside a lower end of the tower, effectively forming a water tight and gas tight first, lower seal and the visco-elastic substance in the surface area of the inner surface of the offshore element is partly pushed upward out onto an upper end of the offshore foundation pile, effectively forming a water and gas tight second, upper seal.

12. The method according to claim 3, wherein the visco-elastic substance supports a weight of the offshore element.

13. The method according to claim 10, wherein the surface area of the upper end of the offshore foundation pile is a first continuous, substantially truncated conical surface, wherein the surface area of the lower end of the at least one offshore element is a second substantially continuous, truncated conical surface, and wherein the visco-elastic substance after forming the slip joint forms two longitudinally spaced apart, ring shaped seals between said first and second substantially truncated conical surfaces.

14. The method according to claim 3, wherein the visco-elastic substance is applied such that overlapping surfaces of the top end of the offshore foundation pile and the at least one offshore element are separated from each other by said visco-elastic substance, such that after mounting of the offshore element a weight of the offshore element is transferred to the offshore foundation pile by the visco-elastic substance.

15. The method according to claim 3, wherein the at least one offshore element comprises a tower, and wherein:
   the visco-elastic substance is applied to the outer surface of the offshore foundation pile, such that after forming the slip joint, part of the visco-elastic substance extends below a lower edge of the tower; and
   the visco-elastic substance is applied to the inner surface of the tower, such that after forming the slip joint, part of the visco-elastic substance extends above an upper edge of the offshore foundation pile.

16. The method according to claim 3, wherein a first slip joint is formed by directly mounting a platform on the offshore foundation pile and a second slip joint is formed by directly mounting a tower on the offshore foundation pile, both the first slip joint and the second slip joint being provided with said visco-elastic substance, wherein the forming of the second slip joint is above the first slip joint and after the first slip joint is formed.

\* \* \* \* \*